United States Patent Office 2,873,266
Patented Feb. 10, 1959

2,873,266

POLYMERIC MATERIALS AND METHOD OF PRODUCING SAME

Subbaraju Venkataramaraj Urs, Chicago, Ill., assignor, by mesne assignments, to Union Carbide Corporation, a corporation of New York No Drawing. Application December 27, 1955
Serial No. 555,235

6 Claims. (Cl. 260—77.5)

This invention relates to polymeric materials. More particularly, it relates to new and improved polyurethanes and the method of preparing the same, as well as articles formed thereof.

Films formed of polyurethanes obtained by reacting an aliphatic glycol and an aliphatic diisocyanate are brittle and hence, not suitable for use where a flexible film is required. No satisfactory polyurethane plasticizer producing a satisfactory polyurethane film of the desired flexibility has been found. Likewise, attempts to produce a self-plasticized polyurethane film have not been successful.

An object of this invention is to provide new and improved polymeric materials.

Another object of this invention is to provide new and improved polyurethanes capable of producing flexible film.

An additional object of this invention is to provide a method of preparing the aforementioned polymeric materials.

A specific object of this invention is to provide self-plasticized polyurethane films.

Other and additional objects will become apparent hereafter.

The above objects are accomplished in general by reacting a mixture containing primary and secondary glycols, each of which contains at least 4 carbon atoms between the hydroxyl groups, with an aliphatic diiso compound containing two groups of the formula —N=C=X separated by at least 4 carbon atoms and where X is an element selected from the class consisting of oxygen and sulphur.

In one embodiment for producing polyurethane the reaction is carried out in a liquid medium in which the polyurethane is insoluble whereby it will be precipitated and thereafter can easily be separated, as by filtration, from the reaction mass. In this embodiment, the selected glycols are added to the liquid medium and after the mass is heated to a temperature of 60°–70° C. and while it is being agitated, the diisocyanate is added gradually and slowly. When all the diisocyanate has been added, the resulting mass is refluxed until the resulting solid polyurethane upon test, will produce a film having the desired film forming properties. This usually takes from 7 to 14 hours. The mass is then filtered and the solid polyurethane is washed to remove impurities, then treated with steam or hot water to destroy any unreacted isocyanate groups, and finally dried.

Polyurethanes of this invention are insoluble in common well known solvents, such as acetone, methanol, benzene, etc. However, they are soluble in phenol, cresol, a 90% phenol-10% water mixture at room temperature and in dimethyl formamide, pyridine, cyclohexanol at temperatures approximately 5°–10° C. below the boiling point of the respective solvent. They are thermoplastic and can be melt extruded or cast.

Films obtained by melt extrusion or casting of the polyurethane of this invention are flexible over a wide range of temperature and retain their flexibility over a wide temperature range, such as from —20° F. up to its softening point. In other words, such films are self-plasticized. They are also transparent, tough, strong, stable, practically impervious to oxygen and nitrogen and exhibit a low permeability to carbon dioxide and moisture vapor. They are also printable, thermoplastic, and heat sealable.

Any one or more primary and one or more secondary aliphatic glycols, each containing at least 4 carbon atoms between the hydroxyl groups, can be used in the mixture to be reacted. The aliphatic radicle between the hydroxyl groups can be a straight or branched chain or cyclic. The chain can also contain a hetero-atom such as oxygen.

Typical examples of the glycols which can be used in this invention are: polymethylene glycols of the general formula $HO(CH_2)_nOH$ where $n$ is at least 4, such as tetramethylene glycol, pentamethylene glycol, hexamethylene glycol, decamethylene glycol etc.; polyether glycols of the general formula $HO(CH_2)_nO(CH_2)_nOH$ where $n$ is at least 2, such as polyethylene glycols, polypropylene glycols, etc.; secondary glycols of the general formula

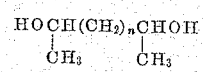

where $n$ is at least 2, such as 2,5-hexane diol, 2,6-heptane diol, 2,7-octane diol etc.; mixed primary and secondary glycols of the general formula

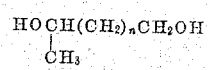

where $n$ is at least 2 such as 1,6-heptanediol, 1,7-octanediol, 1,6-octanediol, 1,7-nonanediol, etc., and cyclic glycols such as 1,4-cyclo hexylene glycol, etc.

As previously mentioned to produce polymeric materials such as polyurethanes capable of producing film of improved properties, especially flexibility, it is essential that the mixture contain at least two glycols of the nature herein described. Any mixture in which the secondary glycol is present in an mole amount of 5% to 95% and the primary glycol or glycols is present in a corresponding mole amount of 95% to 5% and reacted as herein described will produce polyurethanes from which film produced will be characterized by improved flexibility as compared to film produced from prior art polyurethanes obtained from a single glycol. A mixture containing a mole amount of 10% to 50% of a secondary glycol and a corresponding mole amount of 90% to 50% of a primary glycol is particularly suitable. Optimum results however are obtained when the glycol mixture contains a mole amount of 10% to 20% of a secondary glycol and a mole amount of 90% to 80% of a primary glycol.

A plurality of the selected glycols are formed into a mixture preferably as by being dispersed or dissolved either at room or elevated temperature in any solvent which is inert with respect to the polyurethane to be produced. Solvents boiling above 100° C. for example, hydrocarbons, such as tetralene, xylene, mesitylene and halogenated hydro-carbons, such as chlorobenzene, ortho dichlorobenzene and 1,3,5-trichlorobenzene, as well as mixtures thereof, are typical examples which are particularly suitable.

The concentration of the mixture of glycols in the solvent can vary widely. A concentration of from about 5% to about 25% by weight of the glycols will produce satisfactory results.

Any aliphatic diiso compound, such as diisocyanates, diisothiocyanates and mixed isocyanates-isothiocyanates, which contain two groups of the formula —N=C=X separated by at least 4 carbon atoms and where X is an element of the class consisting of oxygen and sulphur can be used. The —N=C=X groups are the only reactive groups in the diiso compounds and the aliphatic radicle separating the two iso groups can be straight or branched chain or cyclic. Typical examples of diiso compounds which can be used for the production of polyurethanes are polymethylene diisocyantes, such as tetramethylene diisocyanate, pentamethylene diisocyanate, hexamethylene diisocyanate, etc.; cyclo alkylene diisocyanates, such as cyclo hexylene 1,4-diisocyante; and diisocyanates containing hetero-atoms in the chain such as

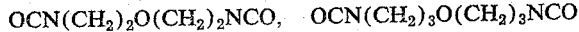

etc. and mixed isocyanate-isothiocyanate, such as 1-isocyanate-6-isothiocyanate hexane.

Typical examples for the production of polythiourethanes of this invention are the diisothiocyanates corresponding to the diisocyanates herein before set out.

The reactants, i. e., the respective amount of the diiso compound and the aggregate amount of the glycols, should be present in equal mole quantities. However, to assure complete reaction, the amount of the diiso compound used is preferably slightly in excess of the theoretical required amount. In general, up to 1.05 moles of the diiso compound per mole of the aggregate amount of glycols can be used. When the quantity of diiso compound exceeds 1.05 moles per mole of the aggregate glycols, the product will tend to become infusible and brittle.

The following examples are illustrative of the methods used in the practice of this invention.

Example 1

169.2 gms. (1.88 moles) tetramethylene glycol and 24.7 gms. (0.22 mole) 2,5-hexanediol were added to a solvent mixture consisting of 1800 cc. of chlorobenzene and 200 cc. of orthodichlorobenzene and were heated to 60°–70° C. 350 gms. (2.105 moles) hexamethylenediisocyanate were added dropwise and the mixture was heated at the refluxing temperature of the solvent mixture for a period of 8 hours.

A white crystalline solid polyurethane was formed. It was filtered, washed with methanol and then with hot water to destroy any unreacted isocyanate groups, and dried in a vacuum oven at 40° C. until free of moisture.

The polyurethane had a M. P. of 178° C. and an intrinsic viscosity of 0.71 in a solution of 90% phenol and 10% water at room temperature (25° C.)

The polymer was insoluble in the common solvents, but soluble in phenol, cresol, and a mixture of 90% phenol and 10% water at room temperature and in dimethyl formamide, pyridine, cyclohexanol, at temperatures approximately 5° to 10° C. below the respective boiling point of the solvent.

Thin films obtained by melt-casting the polyurethane were thermoplastic, transparent, tough, heat sealable and flexible. The films retained their flexibility over a temperature range of from as low as —20° F. to as high as 240° F.

The aforementioned film also had the following properties:

1. Gas transmission—
     Oxygen_____ Practically none.
     Nitrogen_____ Practically none.
     Carbon dioxide___ 50 cc./mil/100 sq. in./24 hrs.
     Moisture vapor___ 1.0 g./mil/100 sq. in./24 hrs.
2. Tensile strength_____ 6,000 pounds per square inch.
3. Tear strength_____ 150 grams per mil.

Example 2

94 gms. (1.039 moles) 1,4-butanediol and 122 gms. (1.034 moles) 2,5-hexanediol were reacted with 350 gms. (2.084 moles) 1,6-hexanediisocyanate in exactly the same manner as in Example 1. The solid polyurethane was isolated as in the above Example 1.

The polyurethane had a melting point of 136° C. and an intrinsic viscosity of 0.62 in solution of 90% phenol and 10% water at room temperature (25° C.).

Thin films obtained by melt-casting this polyurethane had characteristics and properties similar to those set out in Example 1.

Example 3

169.2 gms. (1.88 moles) 1,4-butanediol and 24.7 gms. (0.22 mole) 2,5-hexanediol were reacted with 296 gms. (2.11 moles) 1,4-butanediisocyanate as in Example 1 and the polyurethane was isolated, washed and dried as set out in Example 1.

The polyurethane had a melting point of 188° C. and an intrinsic viscosity of 0.57 in a solution of 90% phenol and 10% water at room temperature (25° C.).

Films obtained by melt-casting the polyurethane had properties and characteristics similar to those set out in Example 1.

In the examples, the moisture vapor transmission value was obtained by the General Foods Method, Modern Packaging, November 1942. The other gas transmission by the method described in the Paper Trade Journal 118, No. 10, 32 (1944).

The tear strength was obtained using TAPPI Method T414–m49, Internal Tearing Resistance of Paper. Tear strength is recorded in grams per 1/1000 inch film thickness.

The polymeric materials and particularly the polyurethanes obtained by this invention are especially suitable for the production, as by melt-extrusion or melt-casting of unsupported, self-sustaining films having improved flexibility. Such films can be made of any desired thickness, such as for example, from 0.0005 to 0.0050 in thickness or more, and since they are heat sealable, they are admirably suited for wrapping and packaging applications. Because of their retention of improved flexibility, they can be used for wrapping and packaging items which are to be maintained under low temperatures, such as —20° F. or lower or at elevated temperatures up to 240° F. or higher, as well as at room temperatures. Due to their low permeability to moisture vapor, they are admirably suitable for the packaging of items which are desired to be maintained at substantially the original moisture content. Similarly, because the films are practically impervious to oxygen and nitrogen, they are particularly adapted for packaging of items which are deleteriously affected by such gases. Likewise, the low permeability to carbon dioxide renders the film especially suitable for the packaging of items which are to be protected by or from carbon dioxide.

Films made of the polymeric materials of this invention, especially the polyurethane, can be used as leather substitutes.

The polymeric materials of this invention and particularly the polyurethanes are also useful in the production of continuous filaments for use as threads, and in the making of fabrics. They also are useful as coatings for cloth, paper, metal, leather, films of all kinds, etc.

Since it is apparent that various changes and modifications may be made in the above specific embodiments without departing from the nature and spirit thereof, this invention is not limited thereto, except as set forth in the appended claims.

I claim:

1. A method of producing thermoplastic polymeric materials soluble in phenol, cresol, dimethyl formamide, pyridine, cyclohexanol, and insoluble in acetone, methanol, and benzene, and being suitable for the production of self-plasticized films which comprises reacting a glycol mixture containing a primary aliphatic glycol having the formula $HO(CH_2)_nOH$ wherein $n$ is an integer from 4 to 10 in a mole amount of 90% to 80% and a secondary aliphatic glycol having the formula

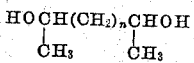

wherein $n$ is an integer from 2 to 4 in a corresponding mole amount of 10% to 20%, with an aliphatic diiso compound containing only two reactive groups, said groups being separated by at least 4 carbon atoms, each of said reactive groups being of the formula —N=C=X, where X is an element selected from the class consisting of oxygen and sulphur, said aliphatic compound being present in a mole amount to give complete reaction with said glycol mixture.

2. A method of producing thermoplastic polyurethanes soluble in phenol, cresol, dimethyl formamide, pyridine, cyclohexanol, and insoluble in acetone, methanol, and benzene, and being suitable for the production of self-plasticized films which comprises reacting a glycol mixture containing a primary aliphatic glycol having the formula $HO(CH_2)_nOH$ wherein $n$ is an integer from 4 to 10 in a mole amount of 90% to 80% and a secondary aliphatic glycol having the formula

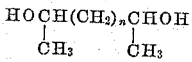

wherein $n$ is an integer from 2 to 4 in a corresponding mole amount of 10% to 20%, with an aliphatic diisocyanate in which the isocyanate groups are separated by at least 4 carbon atoms, said aliphatic diisocyanate being present in a mole amount to give complete reaction with said glycol mixture.

3. A composition of matter comprising polymeric materials resulting from the method set out in claim 1.

4. A composition of matter comprising polyurethanes resulting from the method set out in claim 2.

5. Self-plasticized film formed of polymeric materials resulting from the method set out in claim 1.

6. Self-plasticized film formed of polyurethanes resulting from the method set out in claim 2.

References Cited in the file of this patent

UNITED STATES PATENTS

| | | |
|---|---|---|
| 2,449,613 | Miller et al. | Sept. 21, 1948 |
| 2,723,935 | Rodman | Nov. 15, 1955 |

FOREIGN PATENTS

| | | |
|---|---|---|
| 64,452 | Netherlands | Oct. 15, 1949 |

OTHER REFERENCES

"Supplemental Report on Applications of Diisocyanates," by Lockwood, Technical Industrial Intelligence Division, U. S. Dept. of Commerce; Fiat Final Report No. 1301, 15, Sept. 1947, page 6.